(12) United States Patent
Wang et al.

(10) Patent No.: US 11,778,335 B2
(45) Date of Patent: *Oct. 3, 2023

(54) GENERATING HIGH DYNAMIC RANGE VIDEO USING LOW DYNAMIC RANGE IMAGE SENSOR

(71) Applicant: BLACK SESAME TECHNOLOGIES INC., San Jose, CA (US)

(72) Inventors: Chao Wang, Shanghai (CN); Donghui Wu, San Mateo, CA (US); Bin Chen, San Jose, CA (US); Jiaju Yue, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 17/079,117

(22) Filed: Oct. 23, 2020

(65) Prior Publication Data

US 2022/0132016 A1 Apr. 28, 2022

(51) Int. Cl.
*H04N 23/741* (2023.01)
*G06T 5/00* (2006.01)
*G06T 5/50* (2006.01)

(52) U.S. Cl.
CPC .......... *H04N 23/741* (2023.01); *G06T 5/009* (2013.01); *G06T 5/50* (2013.01); *G06T 2207/10016* (2013.01); *G06T 2207/20208* (2013.01); *G06T 2207/20221* (2013.01)

(58) Field of Classification Search
CPC .. H04N 23/741; H04N 23/743; H04N 23/951; G06T 5/009; G06T 5/50; G06T 2207/10016; G06T 2207/10024; G06T 2207/20208; G06T 2207/20221; G06T 2207/20084

See application file for complete search history.

(56) References Cited

U.S. PATENT DOCUMENTS

| | | | |
|---|---|---|---|
| 11,223,780 B1 * | 1/2022 | Wang | H04N 23/741 |
| 2012/0218442 A1 * | 8/2012 | Jandhyala | G06T 5/50 |
| | | | 348/E5.051 |
| 2017/0186162 A1 * | 6/2017 | Mihic | G06T 7/80 |
| 2018/0241929 A1 * | 8/2018 | Bouzaraa | G06T 5/009 |

FOREIGN PATENT DOCUMENTS

| | | |
|---|---|---|
| CN | 107277387 A | 10/2017 |
| CN | 108419023 A | 8/2018 |
| EP | 3494693 A1 | 6/2019 |

* cited by examiner

*Primary Examiner* — Kelly L Jerabek
(74) *Attorney, Agent, or Firm* — Timothy Wang; Ni, Wang & Massand, PLLC

(57) ABSTRACT

An example method of single-exposure multiple-frame image capture, making an HDR video, comprising, capturing a series of frames at an underexposed setting, selecting a reference image from the series of frames, aligning the series of frames to the reference image, merging the series of frames into one frame based on the reference image, indexing the reference image to a next frame in the series of frames, resulting in an indexed reference image, realigning the series of frames to the indexed reference image and remerging the series of frames into a single frame based on the indexed reference image.

5 Claims, 12 Drawing Sheets

GENERATING HIGH DYNAMIC RANGE VIDEO USING LOW DYNAMIC RANGE IMAGE SENSOR

BACKGROUND

Technical Field

The instant disclosure is related to generating video and specifically to generating high dynamic range video using a low dynamic range image sensor.

Background

The dynamic range of a scene may be much greater than a current low dynamic range (LDR) image sensor is capable of capturing. A current low dynamic range image sensor being utilized to capture a high dynamic range (HDR) scene will either saturate brightly lit areas or fail to capture a sufficient number of photons in poorly lit areas. Currently, the capture of a high dynamic range scene may utilize a specially designed high dynamic range sensor.

Currently, utilization of high dynamic range sensors is rarely reported due to the difficulties in expanding the capacity of the sensor. Generally, the use of a high dynamic range sensor leads to higher fixed pattern noise, and implementation is expensive and limited.

SUMMARY

An example method of single-exposure multiple-frame image capture, making an HDR video, comprising, capturing a series of frames at an underexposed setting, selecting a reference image from the series of frames, aligning the series of frames to the reference image, merging the series of frames into one frame based on the reference image, indexing the reference image to a next frame in the series of frames, resulting in an indexed reference image, realigning the series of frames to the indexed reference image and remerging the series of frames into a single frame based on the indexed reference image.

Another example method of multiple-exposure multiple-frame image capture, making an HDR video, comprising, capturing a first series of frames at a first underexposed setting, selecting a first reference image from the first series of frames, aligning the first series of frames to the first reference image, merging the first series of frames into one first frame based on the first reference image, capturing a second series of frames at a second underexposed setting, selecting a second reference image from the second series of frames, aligning the second series of frames to the second reference image, merging the second series of frames into one second frame based on the second reference image and fusing the one first frame and the one second frame.

A further example method of multiple-exposure multiple-frame image capture, making an HDR video, comprising, capturing a first series of frames at a first underexposed setting, selecting a first reference image from the first series of frames, aligning the first series of frames to the first reference image, merging the first series of frames into one first frame based on the first reference image, capturing a second series of frames at a second underexposed setting, selecting a second reference image from the second series of frames, aligning the second series of frames to the second reference image, merging the second series of frames into one second frame based on the second reference image, capturing a third series of frames at a third underexposed setting, selecting a third reference image from the third series of frames, aligning the third series of frames to the third reference image and merging the third series of frames into one third frame based on the third reference image and fusing the one second frame and the one third frame into a first fused frame; and fusing the one first frame and the first fused frame.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
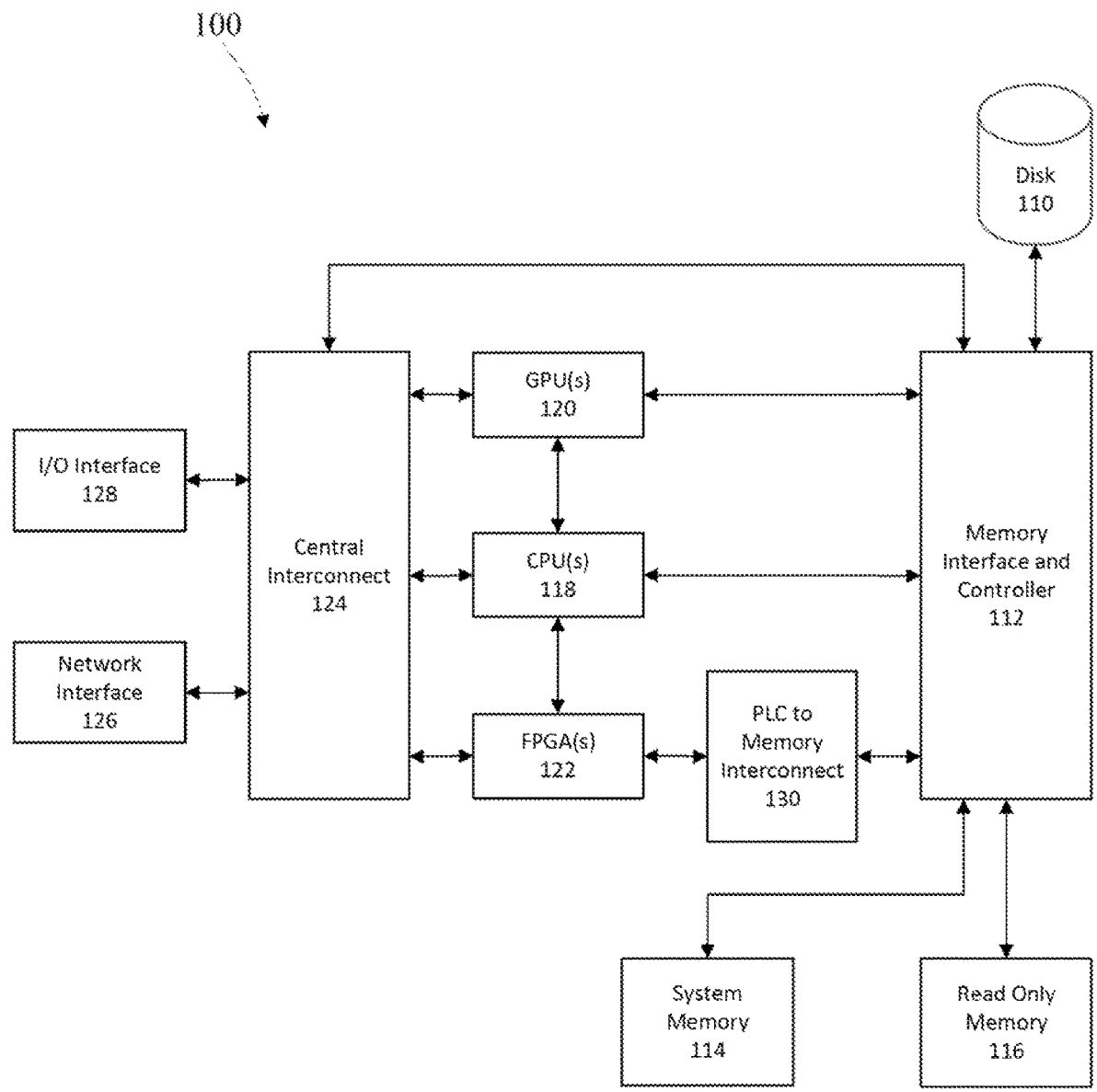
FIG. 1 depicts a first example system diagram in accordance with one embodiment of the disclosure.

FIG. 1 depicts an example hybrid computational system 100 that may be used to implement neural nets associated with the operation of one or more portions or steps of process 600. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 are additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller are connected to a central interconnect 124, the central interconnect is additionally connected to the GPU 120, CPU 118 and FPGA 122. The central interconnect 124 is additionally connected to the input and output interface 128 and the network interface 126.

Figure 2:
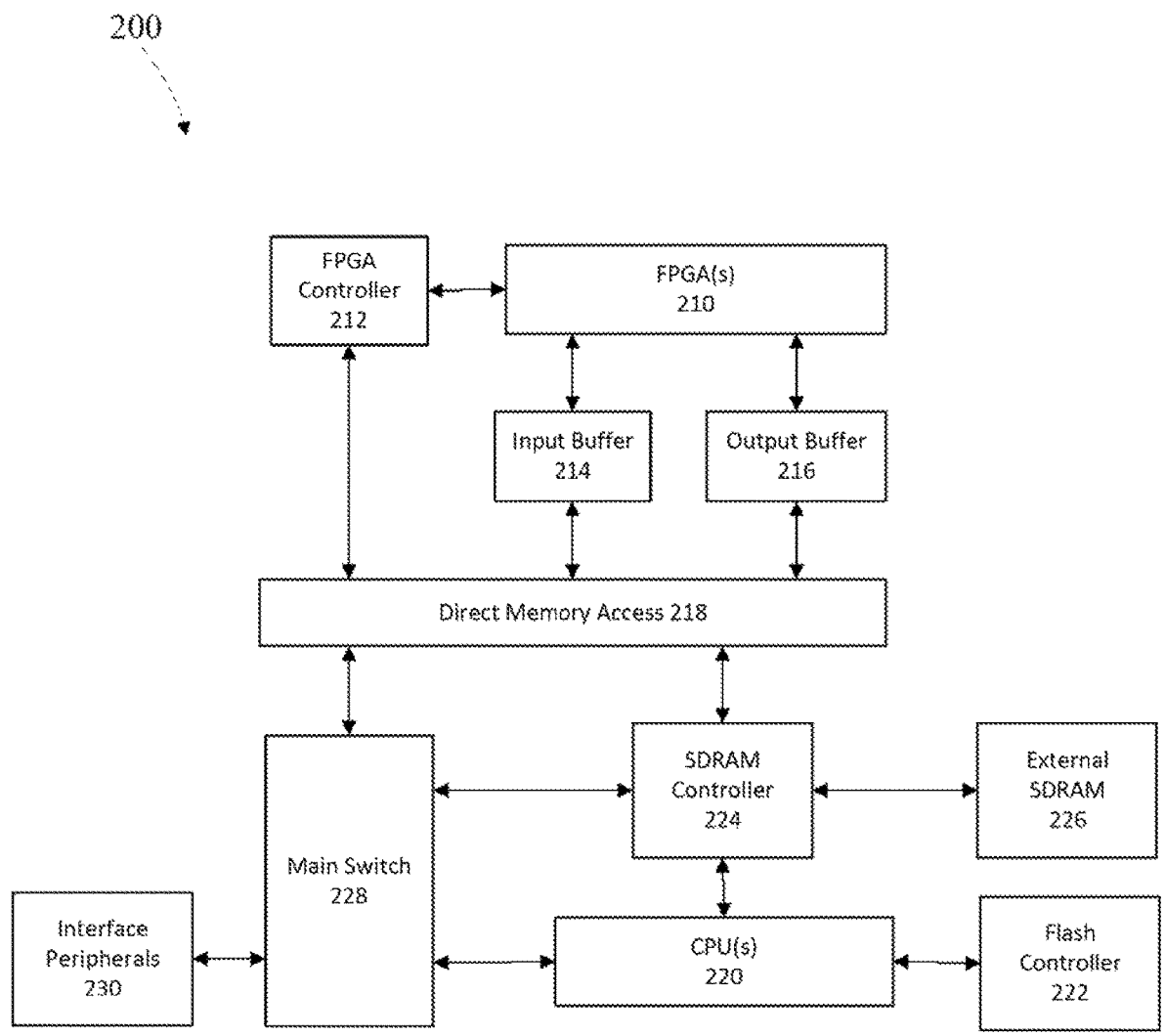
FIG. 2 depicts a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

In some advanced sensors, different pixels within the sensor may be exposed with different integration times, gains, and/or sensitivities. The outputs of the various pixels are then fused into a single output frame. The different pixels work as one, and is transparent to the user, thus it works like a single high dynamic range sensor. These sensors are also expensive because of the complex pixel design and timing control. Generally, different exposures cover different spatial spans within the pixel array area and a full-sized high dynamic range output sacrifices the sensor's original resolution for the increased dynamic range.

Methods have been put forward to capture high dynamic range images with non-high dynamic range sensors in which the sensors capture the scene several times and then merge the information into a high dynamic range output.

One method currently used is to capture the scene multiple times, with different exposure times and/or ISO multiple-exposure (ME). The shorter exposure times and a lower ISO capture the scene in well-lit regions and allow higher sensitivity in poorly-lit regions with a longer exposure time and a higher ISO capture. This method allows selection of the most pertinent information from the different exposures and merges them into a single frame.

Currently, processing photographic data utilizing raw data has interests due to benefits based on the linearity property and noise models of raw data. These methods capture the scene in multiple short, identical exposures in linear raw format, this method is referred to as a single-exposure-multiple-frame (SEMF) method. The module may align and accumulate these short exposure images. As a result of this accumulation, the well-lit areas in single short exposure image may be extended to a higher dynamic range value, while the poorly-lit areas may be accumulated to a higher signal level as if exposed with a long exposure.

The globally and locally aligned frames, aligned to a reference frame, are essentially accumulated into an intermediate image, together with a locally varying weight. Eqn. (1)

$$\text{CumImage}(x) = \sum_{i=1}^{F} W_i(x) \text{Im}_i(x) \quad (1)$$

Essentially, the accumulated image is normalized to the locally varying weights. Furthermore, another global normalizer K is introduced to facilitate usage between dynamic range extension and noise reduction. The merged image may be represented as Eqn. (2)

$$\text{MergedImage}(x) = \frac{\sum_{i=1}^{F} W_i(x) \text{Im}_i(x)}{K \sum_{i=1}^{F} W_i(x)} \quad (2)$$

To simplify the analysis on K, $W_i(x)=1$ for x and $1 \le i \le F$. Thus the merged image becomes Eqn. (3)

$$\text{SimpledMergedImage}(x) = \frac{\sum_{i=1}^{F} \text{Im}_i(x)}{K \, F} \quad (3)$$

From equation (3), several items become known pertaining to the normalizer K.

1. When K is 1, then the merged image is of the same signal level as each input image, so that the output is essentially a de-noised version of the input images, thus the equivalent EV value of the output is identical to the input image. This may be referred to as single-exposure-multiple-frame de-noising.
2. When K is less than 1, the maximum value of the merged image is approximately 1/K times as that of the input single image. As a simple example, when K=0.25, the dynamic range of the merged image is approximately 4 times of the single image. The product of K and F is generally greater than 1, otherwise the simple merged image becomes the summation of the images with a digital gain 1/(KF), which increases the signal level with no practical benefit.
3. When K equals to 1/F, the simple merged image is a summation of the input images, which approximates a longer exposure, F times of the individual short exposure, with the well-lit details preserved, i.e., the dynamic range is extended by F times. The equivalent EV value is increased by about $\log_2(P)$, comparing to the individual input image. This is referred to as single-exposure-multiple-frame fusion.

High dynamic range plus (HDR+) is a type of single-exposure-multiple-frame method. The linear data generation is performed in full-resolution alignment and merging, with noise reduction and/or dynamic range extension. The subsequent image signal processing such as white balance, de-mosaic, chroma de-noise, tone-mapping, sharpening, and the like, is a commonly-used flow in a traditional image signal processor or high dynamic range data tone-mapping. HDR+ is robust with respect to alternate choices for a reference frame, and may be converted to a de-noised video.

The reference exposure selection method is similar to single-exposure-multiple-frame de-noising, in that the sensor captures the raw data stream with an underexposed setting. In one example the individual exposure value (EV) may be −T (T>0), i.e., the data value is about $½^T$ of a common exposure. If the single-exposure-multiple-frame fusion flow works with $2^T$ frames, then after aligning these frames and accumulating, the accumulated image in equation (3) is approximately $2^T$ times of a single image. This output is similar to a commonly exposed one (EV=0), with the saturation level increased to $2^T$ times of that of individual frame EV=−T.

In another example, a sensor may capture 16 frames of raw data, with exposure EV=−4, 10-bit frames. After aligning and accumulating, the well-lit area data may be extended to 14-bit, and have values in poorly-lit areas approximating to EV=0 in the same scene. Thus, the accumulated data is a dynamic range extended version.

Extending the concept to video mode, the sensor may capture the 10-bit raw frames with EV=−T, having an exemplar value of T=4. Setting an input frame N−1 as a reference, accumulating input frames $(N-2^T)$~$(N-1)$, single-exposure-multiple-frame fusion may output a (10+T)-bit high dynamic range data with EV=0, aligned to input frame N−1. When the next raw frame (frame N) is captured, it may be set it as the new reference frame, and accumulating input frame $(N-2^T+1)$~N, single-exposure-multiple-frame fusion may output a (10+T)-bit high dynamic range data which is aligned to frame N, and so on.

Putting these output frames together, forms a (10+T)-bit high dynamic range video with having a brightness level similar to EV=0. The process flow is shown by FIG. 3.

Figure 3:
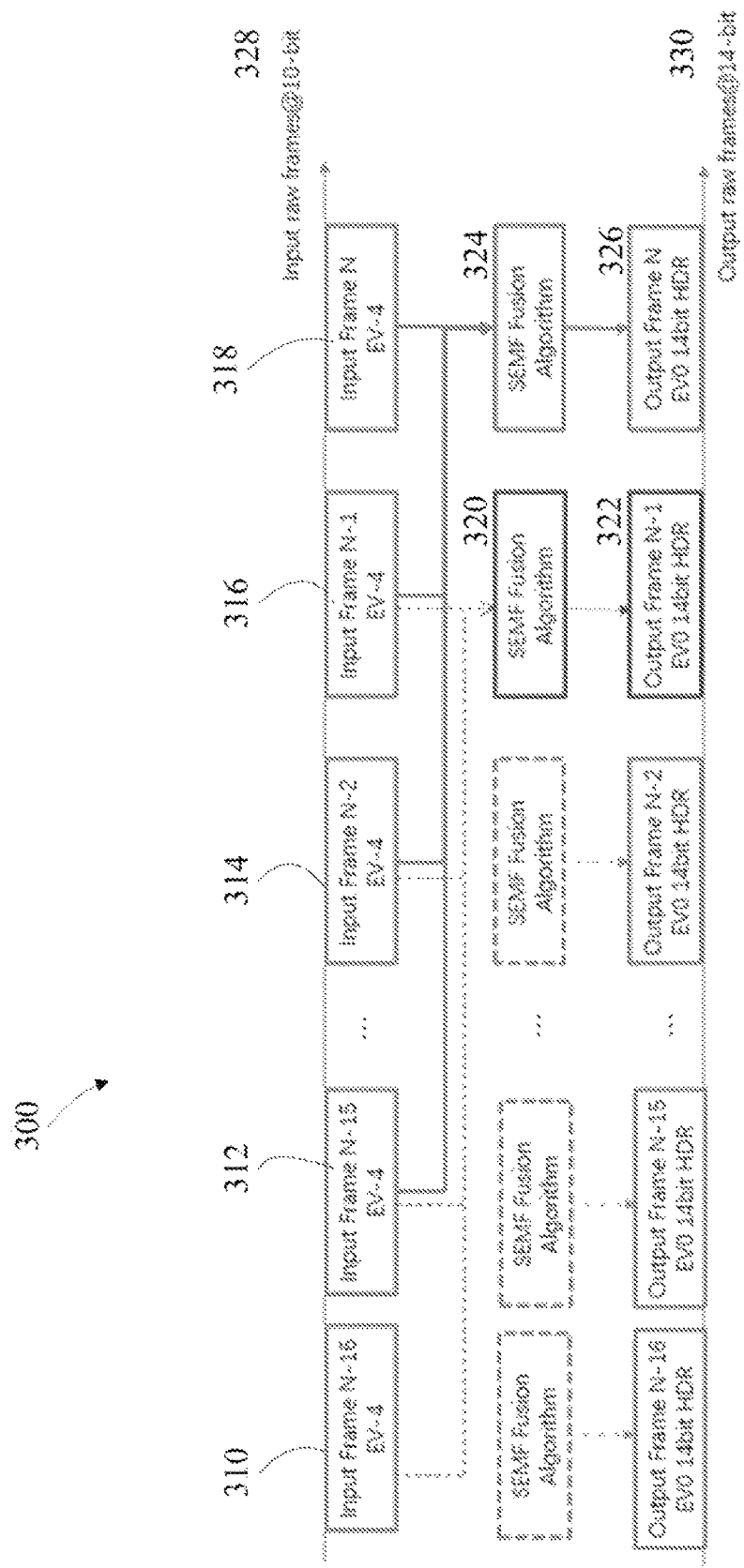
FIG. 3 depicts an example flow video mode of single exposure multiple frame fusion, by rolling the reference image in accordance with one embodiment of the disclosure.

FIG. 3 depicts an example flow video mode of single exposure multiple frame fusion, by rolling the reference image one by one. In the first iteration frames 310-316 at 10-bit low dynamic range 328 are fused in a single-exposure-multiple-fame module 320 where the input frames are 10-bit low dynamic range and the output 322 is 14-bit high dynamic range 330. The frames are indexed one by one so that in the next iteration, low dynamic range 328 frames 312-318 are input at 10 bits in raw data format, a single-exposure-multiple-frame fusion module 324 is performed and the output frame 326 is high dynamic range 14-bit high dynamic range 330 output at 14 bits.

By applying a traditional image signal processor and high dynamic range tone-mapping method, this video can be previewed on a low dynamic range display.

As mentioned above, one step in the single-exposure-multiple-frame method is to align and merge multiple low dynamic range raw frames into one. By choosing different normalizer K≤1 in Eqn. (2), de-noising and/or dynamic range extension, may be achieved.

In the single-exposure-multiple-frame method, the under-exposed EV may have a lower limit due to the limitation in capturing a large number of raw frames on a mobile phone. Additionally, when the EV value is low, the captured raw data itself may be noisy, which limits the possible dynamic range extension for single-exposure-multiple-frame fusion.

Continuing the previous example, if 16 frames of 10-bit raw data is captured with EV=−4 and single-exposure-multiple-frame fusion produces a single-frame high dynamic range data at 14-bit, equivalent EV=0. The dynamic range may be extended to about 16× of a direct frame with EV=0. However, in low-light conditions at night, the dynamic range between well-lit areas such as those illuminated by the neon lights and poorly lit areas may be far higher than 16×, thus the well-lit areas lose details/colors even when EV=−4. In this case, the exposure values for well-lit areas needs to be further decreased. In this case, one extra short exposure may be captured with EV=−8 to cover the well-lit area. This then creates a potential problem in combining 10-bit raw data with EV=−8 into a single-frame high dynamic range data at 14-bit with EV=0. This kind of different exposure data, with different EV values, combination is called high dynamic range-low dynamic range fusion, and may accommodate different bit depths.

In a single-frame case, high dynamic range data with EV=0 as $H_0$, h-bit having as a maximum value as MaxH≈$2^h$; and low dynamic range data with EV=−E as $L_{-e}$, 1-bit having a maximum value as MaxL≈$2^l$. The definition of EV is logarithmic, the exposure ratio between $H_0$ and $L_{-E}$ may be given by Eqn. (4)

$$R_{\frac{H_0}{L_{-E}}} = 2^E \quad (4)$$

For an unsaturated pixel X in $H_0$, the value of $H_0(X)$ and $RL_{-E}(X)$ may be comparable due to the linearity of raw data, but may not be identical because of the existence of noise. In general, the signal to noise ratio (SNR) of $H_0(X)$ may be higher than that of $RL_{-E}(X)$.

For a saturated pixel X in Ha, the data in the combined result may be chosen as $RL_{-E}(X)$, which implies another constraint on the maximum value of $H_0$ and that of $L_{-E}$, i.e., $R \cdot MaxL \geq MaxH$, in other words, $l+E \geq h$.

Figure 4:
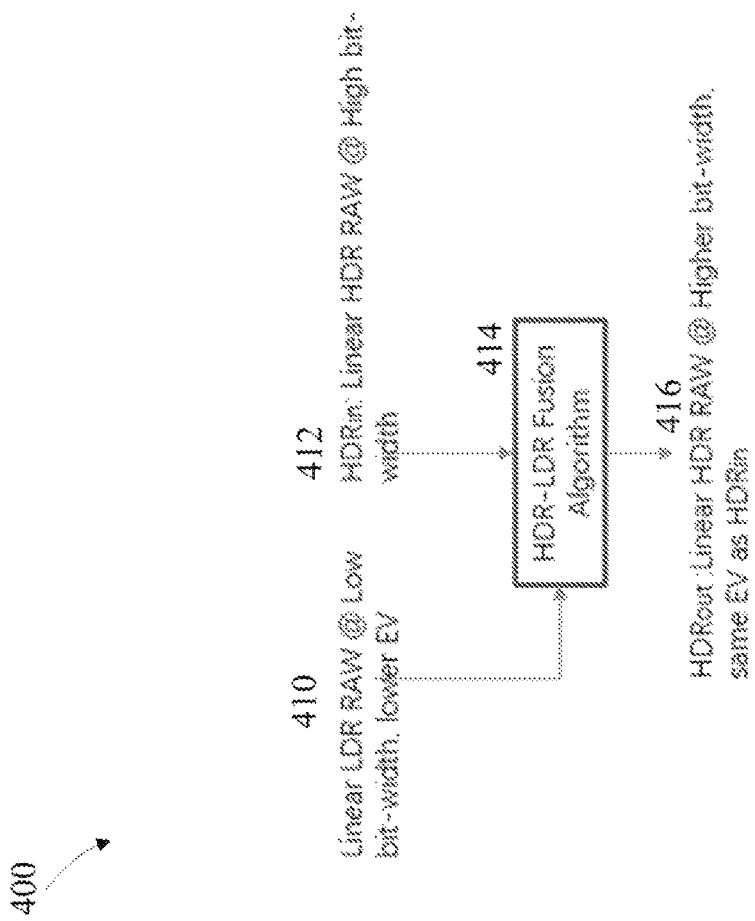
FIG. 4 depicts an example combination of single frame high dynamic range and low dynamic range data in accordance with one embodiment of the disclosure.

In this way, the high dynamic range-low dynamic range fusion block shown in FIG. 4 may be described as Eqn. (5)

$$HDR_{out}(x) = \begin{cases} H_0(x), & \text{if } H_0(x) < \text{Max}H \\ RL_{-E}(x), & \text{else} \end{cases} \quad (5)$$

The combined data's maximum value may be extended to $R \cdot MaxL$, with a bit depth of $(l+E)$-bit with equivalent $EV=0$.

FIG. 4 depicts an example of the combination of single frame high dynamic range and low dynamic range data. A linear low dynamic range, low bandwidth; low exposure value input 410 fused to a linear, high dynamic range data input 412. The fusion occurs at HDR-LDR fusion module 414 and outputs a high dynamic range linear raw data output 416. The output at 416 is of higher bandwidth and has the same exposure value as the high dynamic range data input 412.

The high dynamic range-low dynamic range fusion extends the data of low exposure value (LEV) by the exposure ratio and puts it into the well-lit area of the high exposure value (HEV) data, referred to as HEV-LEV fusion.

The single-frame HEV data with $EV=ev_h$ as HEV, h-bit with maximum value is $MaxH \approx 2^h$; and the LEV data with $EV=ev_l$ as LEV ($ev_h=ev_l+E$, $E>0$), l-bit with maximum value is $MaxL \times 2^l$. The definition of EV is logarithmic, the exposure ratio between HEV and LEV is given by Eqn. (6)

$$R_{\frac{HEV}{LEV}} = 2^{ev_h - ev_l} \quad (6)$$

For an unsaturated pixel X in HEV, the value of HEV(X) and R·LEV(X) may be comparable due to the linearity of raw data, but may not be identical because of the existence of noise. In general, the signal to noise ratio of HEV(X) may be higher than that of R·LEV(X).

For a saturated pixel X in HEV, the data in the combined result may be chosen as R·LEV(X), which implies another constraint on the maximum value of HEV and that of LEV, i.e., $R \cdot MaxL \geq MaxH$, in other words, $l+E \geq h$, entails the same constraint as the high dynamic range-low dynamic range fusion.

Figure 5:
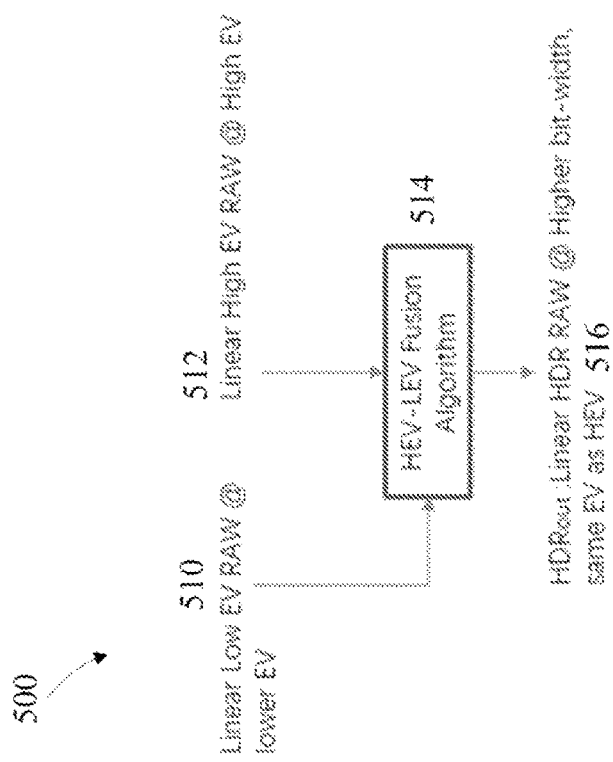
FIG. 5 depicts an example combination of different exposure value data utilizing high exposure value and low exposure value fusion in accordance with one embodiment of the disclosure.

In this way, the HEV-LEV fusion block shown in FIG. 5 may be described as Eqn. (7)

$$HDR_{out}(x) = \begin{cases} HEV(x), & \text{if } HEV(x) < \text{Max}H \\ R \cdot LEV(x), & \text{else} \end{cases} \quad (7)$$

The combined data's maximum value may be extended to $R \cdot MaxL$, bit depth is $(l+E)$-bit with equivalent $EV=EV_h$.

FIG. 5 depicts an example combination of different exposure value data utilizing high exposure value and low exposure value fusion. In this example linear low exposure value raw data 510 and linear, high exposure value input data 512 are fused in HEV-LEV fusion module 514 to output high dynamic range raw high bit width data 516 that has the same exposure value as the high exposure value input data 512.

Using the high dynamic range-low dynamic range fusion method, the dynamic range may be further increased and the output frames into a fluent video.

Figure 6:
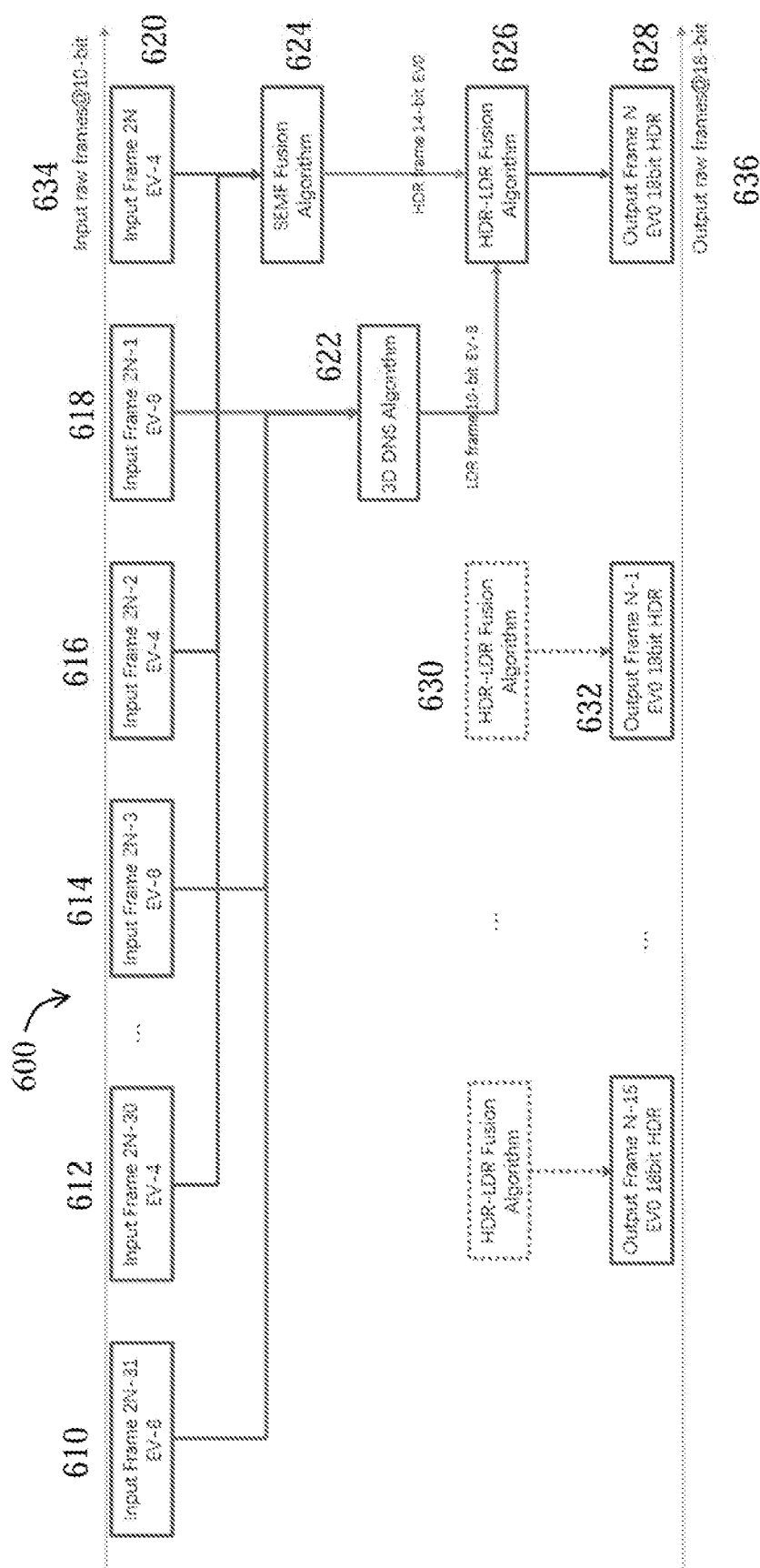
FIG. 6 depicts an example dual exposure flow for multiple exposure multiple frame video in accordance with one embodiment of the disclosure.

A dual exposure mode example is shown in FIG. 6. The camera captures two different exposures 10-bit raw. N frames with EV=−4 are input to the single-exposure-multiple-frame fusion when the $2N^{th}$ frame is upcoming. The single-exposure-multiple-frame fusion outputs a high dynamic range data at 14-bit with EV=0. N frames with EV=−8 at 10-bit are used to implement a temporal three-dimensional (3D) de-noising module, and outputs a noise reduced low dynamic range raw data at 10-bit with EV=−8. The high dynamic range data at 14-bit with EV=0 and the de-noised low dynamic range data at 10-bit with EV=−8 are input to the high dynamic range-low dynamic range fusion, and outputs the high dynamic range data at 18-bit with EV=0. When the sensor captures another two frames with EV=−8 and EV=−4, the same process flow may produce another output frame. These output frames can create a high dynamic range video with the frame rate reduced by 2×.

The interleaved input frames structure (i.e., EV=−8, −4, −8, −4, −8, −4, −8−, −4 . . . ) may provide output frames that are uniformly distributed, comparing to the timing of the input frames, i.e., output one frame for every two input frames, allowing fluent video output and the low dynamic range image input to high dynamic range-low dynamic range fusion allows for de-noising, and thus the well-lit areas demonstrate a good signal to noise ratio.

FIG. 6 depicts an example dual exposure flow for multiple exposure multiple frame video. The lower exposure value (EV=−8) frames 610, 614, 618 are input at 10 bits, low dynamic range 634 and are routed to the three dimensional (3D) de-noising (DNS) module 622, which outputs a low dynamic range 10-bit output at lower exposure value EV=−8. The higher exposure value frames 612, 616, 620 are 10-bit low dynamic range 634 and are routed to a single-exposure-multiple-frame (SEMF) fusion module 624 which outputs a high dynamic range frame at 14 bits at the equivalent of EV=0. The outputs from the three dimensional (3D) de-noising (DNS) module 622 outputting an LDR frame at 10 bits EV=−8, and SEMF fusion module 624, which outputs an HDR frame 14 bits at EV=0 are fused in an HDR-LDR fusion module 626 which outputs an output frame 628 of 18-bit HDR EV=0 data 636.

Furthermore, single-exposure-multiple-frame (SEMF) is a type of 3D DNS, in which the flow may share almost the same structure as single-exposure-multiple-frame fusion.

Multiple-exposures-multiple-frame method flow for a video may be extended to more than two exposures, to achieve even higher dynamic range. For an example shown as FIG. 7, the three exposures input frame sequence may produce an even higher dynamic range output data, with the output frame rate reduced by 3× of the input.

Figure 7:
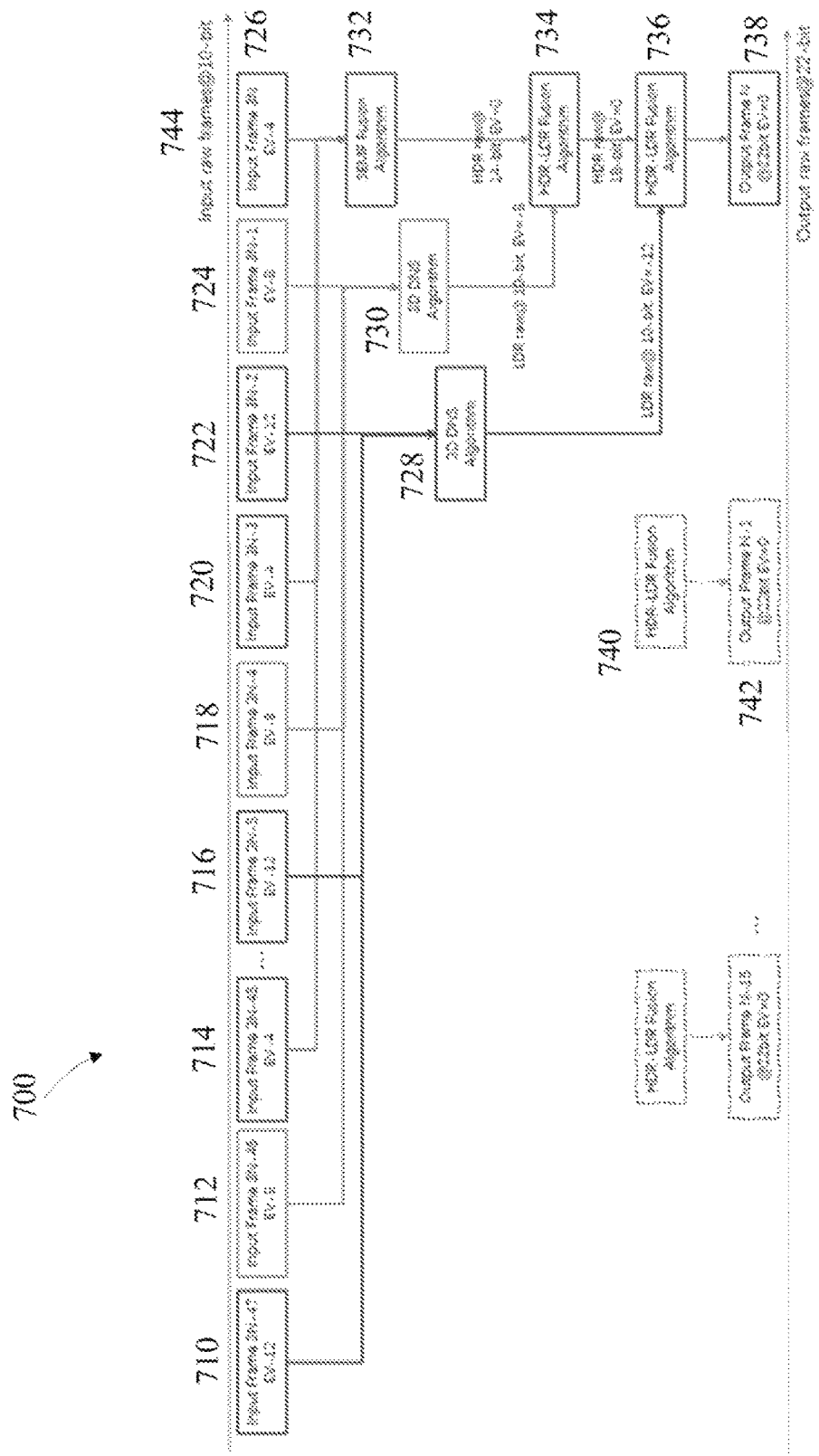
FIG. 7 depicts an example triple exposure flow for multiple exposure multiple frame video with high dynamic range and low dynamic range fusion in accordance with one embodiment of the disclosure.

FIG. 7 depicts an example triple exposure flow for multiple-exposure-multiple-frame video with high dynamic range and low dynamic range fusion. A first set of very low exposure value frames 710, 716, 722 have EV=−12 and input into a 3D DNS module 728 and output an LDR 10-bit output at EV=−12. A second set of low exposure value frames 712, 718, 724 have EV=−8 are input into a 3D DNS module 730 and output LDR at 10 bits with an EV=−8. A third set of higher exposure value frames 714, 720, 726 have EV=−4 and input into a single-exposure-multiple-frame (SEMF) fusion module 732 and outputs HDR at 14 bits with an EV=0. The frames 710-726 are raw data at 10-bit values 744. 3D DNS module 730 and SEMF fusion module 732 input into an HDR-LDR fusion module 734 that outputs HDR at 18 bits with EV=0. The output of the HDR-LDR fusion module 734 and the output of the 3D DNS module 728 are input into an HDR-LDR fusion module 736 which outputs 738, 22 bits at EV=0 746. Previous outputs from previous cycles are found in HDR-LDR fusion modules 740 outputting 22 bits at EV=0, 742.

Multiple-exposure-multiple-frame flow for a video may be extended to more than two exposures, to achieve even higher dynamic range, with HEV-LEV structure. For an example shown as FIG. 8, the three exposures input frame sequence may produce an even higher dynamic range output data, with the output frame rate reduced by 3× of the input. The function and output are similar to the disclosed multiple-exposure-multiple-frame method with high dynamic range-low dynamic range structure.

Figure 8:
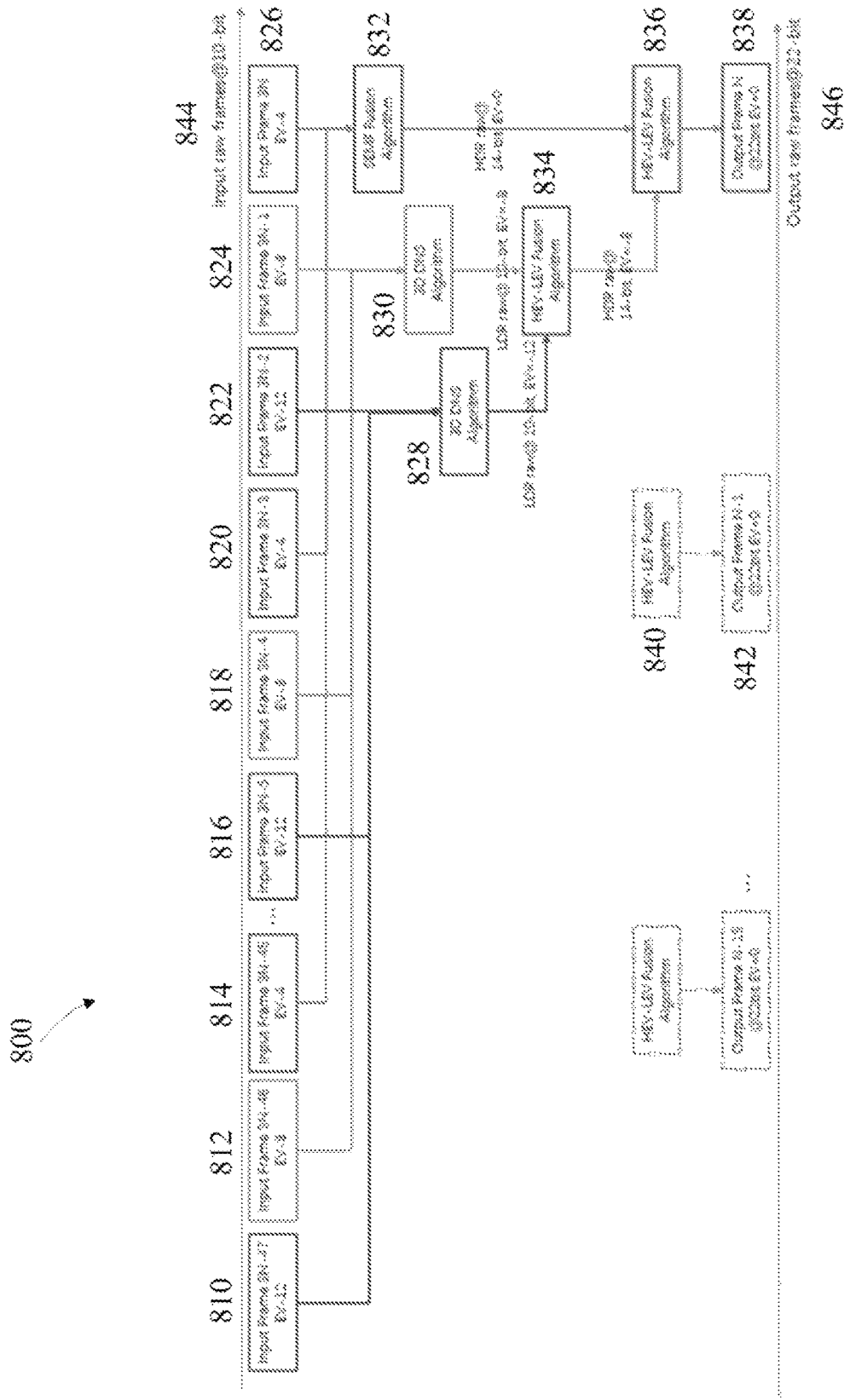
FIG. 8 depicts an example triple exposure flow for multiple exposure multiple frame video with high exposure value and low exposure value fusion in accordance with one embodiment of the disclosure.
Figure 9:
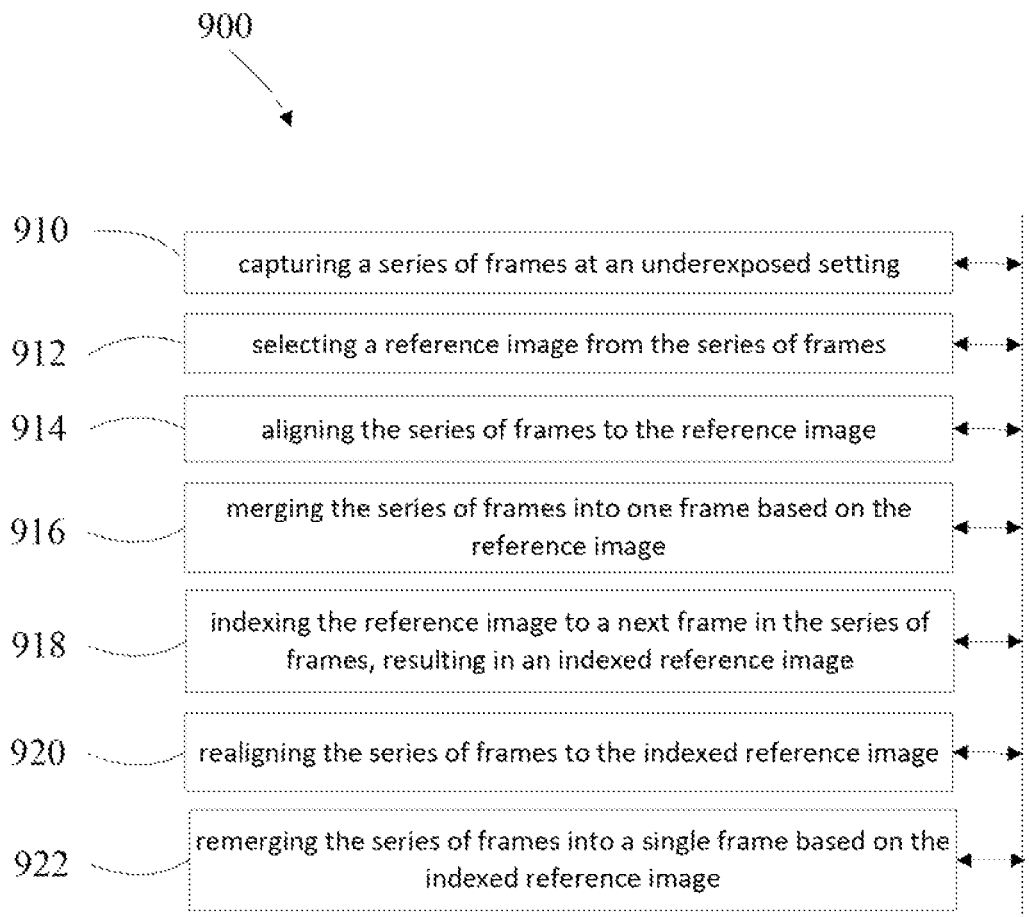
FIG. 9 is a first example method in accordance with one embodiment of the disclosure.
Figure 10:
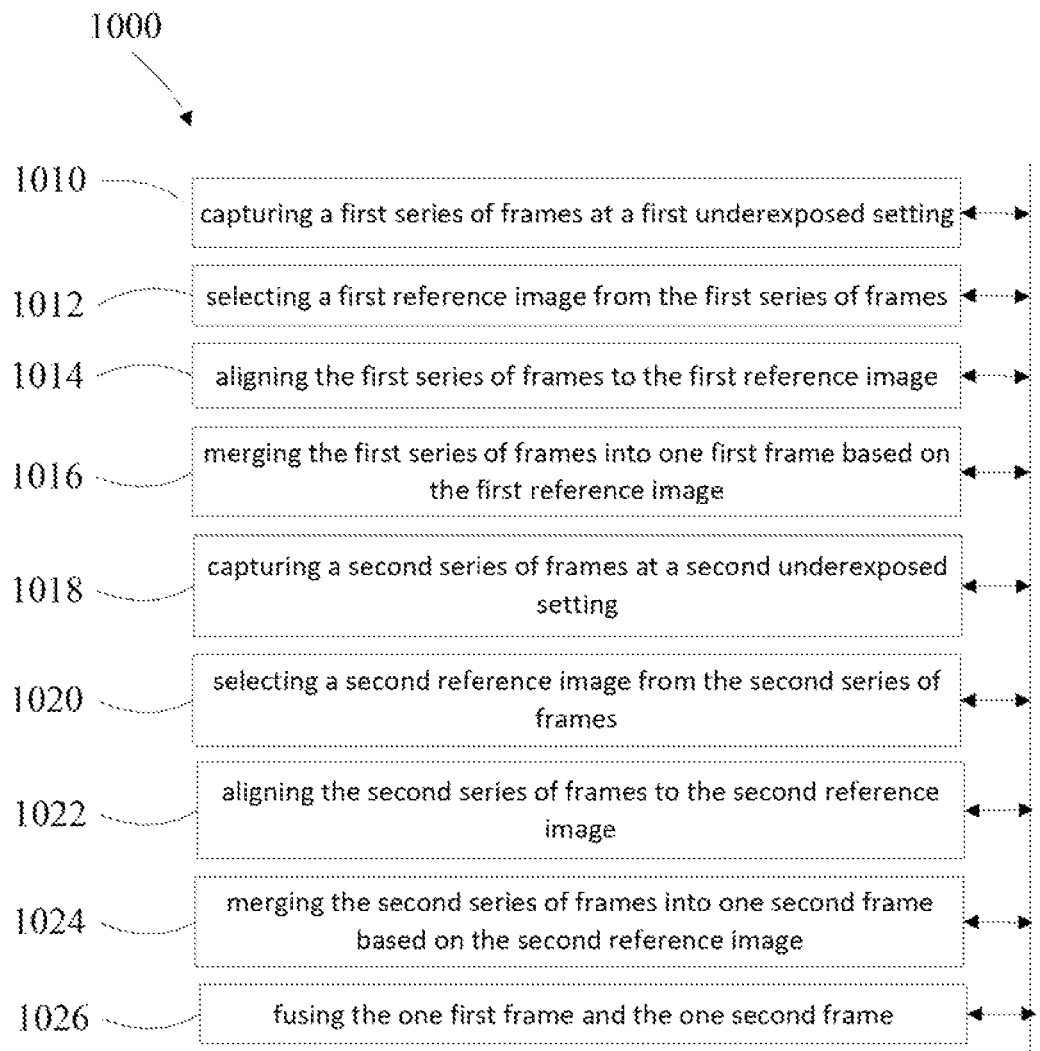
FIG. 10 is a second example method in accordance with one embodiment of the disclosure.
Figure 11:
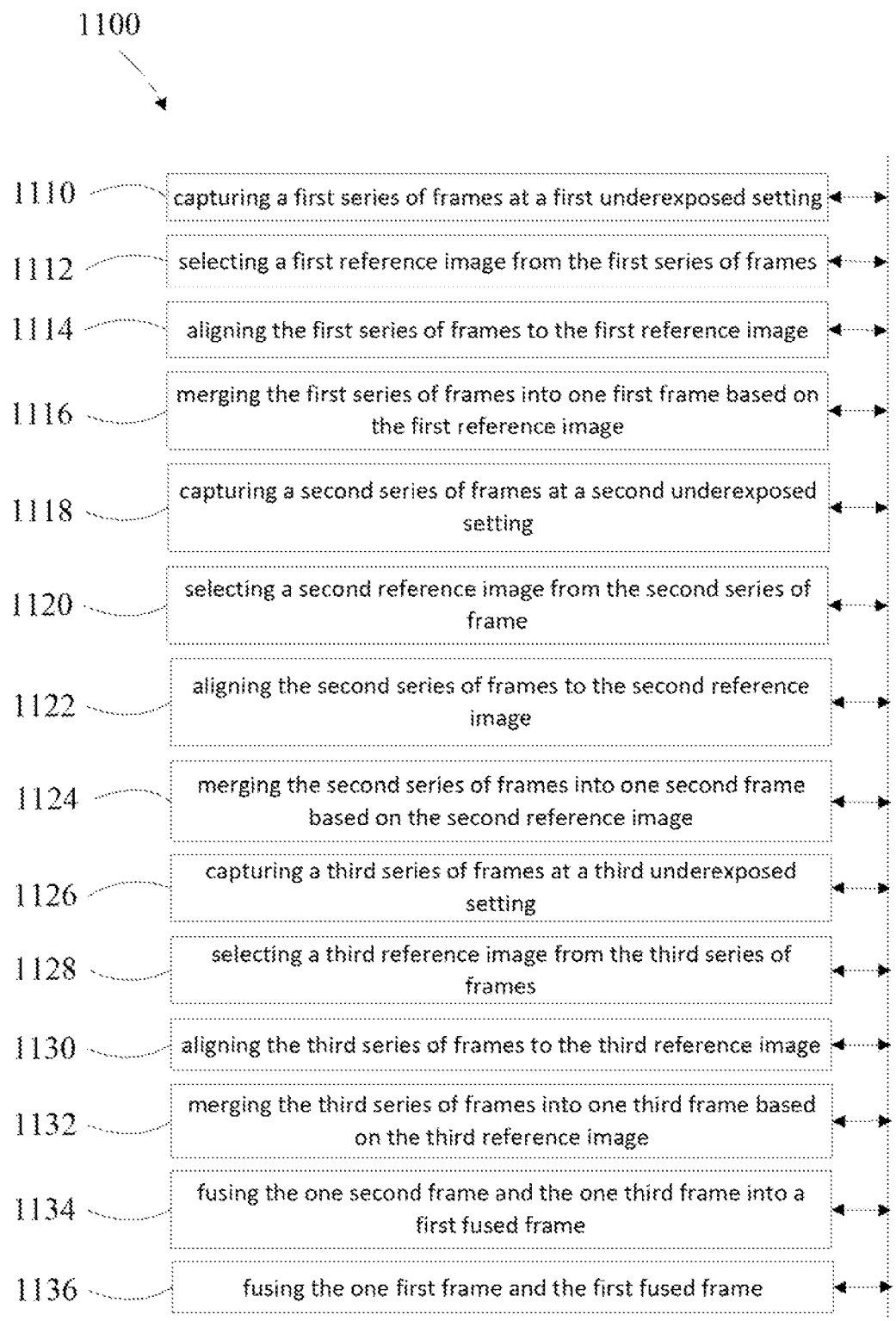
FIG. 11 is a third example method in accordance with one embodiment of the disclosure.
Figure 12:
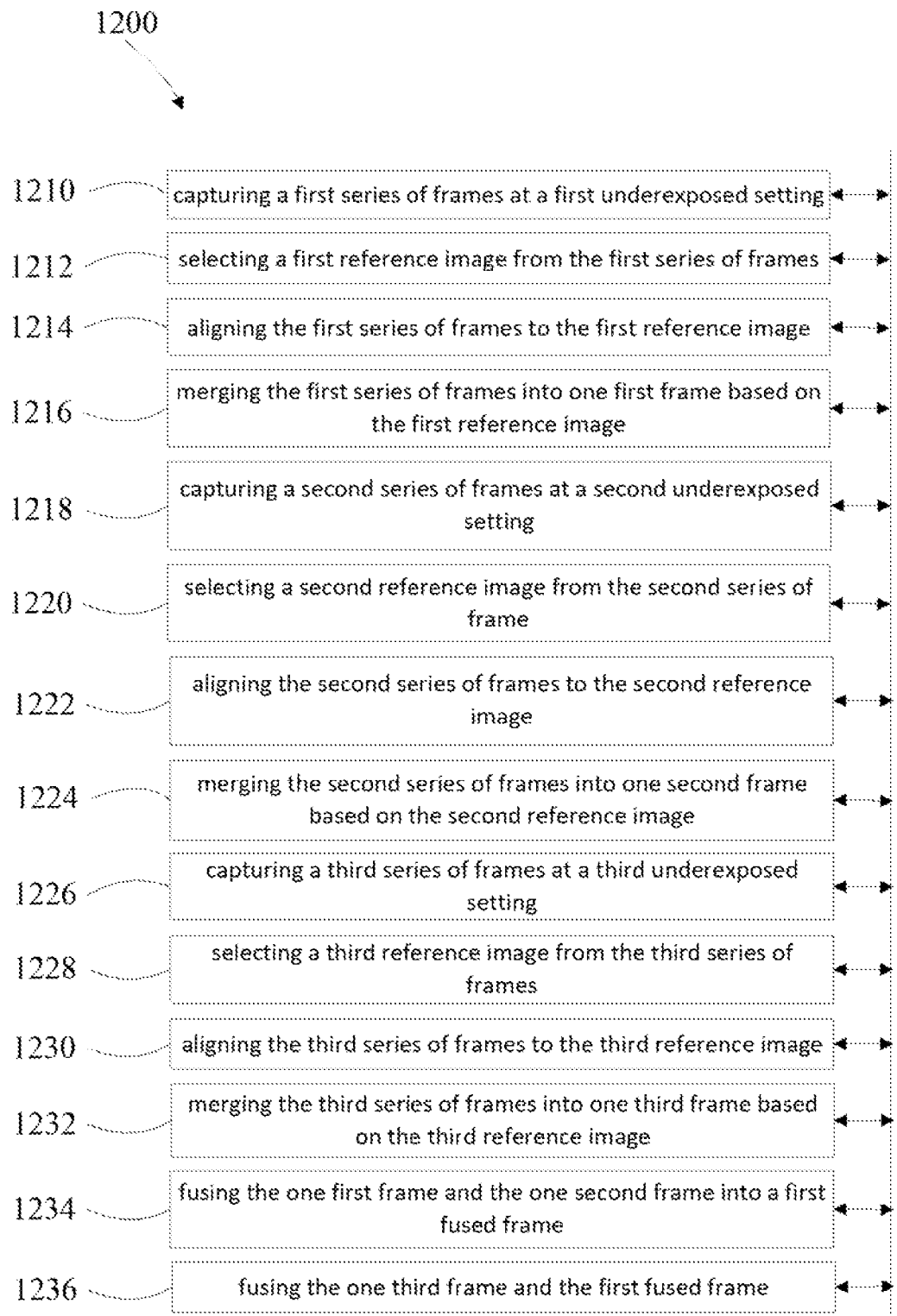
FIG. 12 is a fourth example method in accordance with one embodiment of the disclosure.

FIG. 8 depicts an example triple exposure flow for multiple exposure multiple frame video with high exposure value and low exposure value fusion. A first set of very low exposure value frames 810, 816, 822 have EV=−12 and input into a 3D DNS module 828 and output a LDR 10 bits output at EV=−12. A second set of low exposure value frames 812, 818, 824 have EV=−8 are input into a 3D DNS module 830 and output LDR at 10 bits with an EV=−8. A third set of higher exposure value frames 814, 820, 826 have EV=−4 and are input into a single exposure multiple frame (SEMF) fusion module 832 and output HDR at 14 bits with an EV=0. The frames 810826 are raw data at 10-bit values 844. In this example the 3D DNS module 828 and the 3D DNS module 830 input into an HEV-LEV fusion module 834 which fuses and outputs HDR raw data at 14 bits EV=−8. The output of the HEV-LEV fusion module 834 and the SEMF fusion module 832 are input into an HEV-LEV fusion module 836 which outputs 22 bits at EV=0, 838. The output of the indexed output of raw frames is 22 bits, 846. Previous outputs from previous cycles are found in HEV-LEV fusion modules 840 outputting 22 bits at EV=0, 842.

A first example method of multiple-exposure-multiple-frame image capture comprises capturing 910 a series of frames at an underexposed setting, selecting 912 a reference image from the series of frames and aligning 914 the series of frames to the reference image. The method also includes merging 916 the series of frames into one frame based on the reference image, indexing 918 the reference image to a next frame in the series of frames, resulting in an indexed reference image, realigning 920 the series of frames to the indexed reference image and remerging 922 the series of frames into a single frame based on the indexed reference image.

A second method of multiple-exposure-multiple-frame image capture, comprises capturing 1010 a first series of frames at a first underexposed setting, selecting 1012 a first reference image from the first series of frames, aligning 1014 the first series of frames to the first reference image and merging 1016 the first series of frames into one first frame based on the first reference image. The method includes capturing 1018 a second series of frames at a second underexposed setting, selecting 1020 a second reference image from the second series of frames, aligning 1022 the second series of frames to the second reference image, merging 1024 the second series of frames into one second frame based on the second reference image and fusing 1026 the one first frame and the one second frame.

The method may additionally include indexing a capturing of another first series of frames at the first underexposed setting by N and indexing a capturing of another second series of frames at the first underexposed setting by N. The method may alternately include iteratively indexing a capturing of another first series of frames at the first underexposed setting by N and iteratively indexing a capturing of another second series of frames at the first underexposed setting by N.

A third method of multiple-exposure multiple-frame image capture, comprises capturing 1110 a first series of frames at a first underexposed setting, selecting 1112 a first reference image from the first series of frames, aligning 1114 the first series of frames to the first reference image and merging 1116 the first series of frames into one first frame based on the first reference image. The method also includes capturing 1118 a second series of frames at a second underexposed setting, selecting 1120 a second reference image from the second series of frames, aligning 1122 the second series of frames to the second reference image and merging 1124 the second series of frames into one second frame based on the second reference image. The method includes capturing 1126 a third series of frames at a third underexposed setting, selecting 1128 a third reference image from the third series of frames, aligning 1130 the third series of frames to the third reference image and merging 1132 the third series of frames into one third frame based on the third reference image. The method further includes fusing 1134 the one second frame and the one third frame into a first fused frame and fusing 1136 the one first frame and the first fused frame.

The method may additionally include indexing a capturing of another first series of frames at the first underexposed setting by N, indexing a capturing of another second series of frames at the second underexposed setting by N and indexing a capturing of another third series of frames at the third underexposed setting by N.

The method may alternatively include iteratively indexing a capturing of another first series of frames at the first underexposed setting by N, iteratively indexing a capturing of another second series of frames at the second underexposed setting by N and iteratively indexing a capturing of another third series of frames at the third underexposed setting by N.

A fourth method of multiple-exposure multiple-frame image capture, comprises capturing 1210 a first series of frames at a first underexposed setting, selecting 1212 a first reference image from the first series of frames, aligning 1214 the first series of frames to the first reference image and merging 1216 the first series of frames into one first frame based on the first reference image. The method also includes capturing 1218 a second series of frames at a second underexposed setting, selecting 1220 a second reference image from the second series of frames, aligning 1222 the second series of frames to the second reference image and merging 1224 the second series of frames into one second frame based on the second reference image. The method further includes capturing 1226 a third series of frames at a third underexposed setting, selecting 1228 a third reference image from the third series of frames, aligning 1230 the third series of frames to the third reference image and merging 1232 the third series of frames into one third frame based on the third reference image. The method also includes fusing 1234 the one first frame and the one second frame into a first fused frame and fusing 1236 the one third frame and the first fused frame.

The method may additionally include indexing a capturing of another first series of frames at the first underexposed setting by N, indexing a capturing of another second series of frames at the second underexposed setting by N and indexing a capturing of another third series of frames at the third underexposed setting by N.

The method may alternatively include iteratively indexing a capturing of another first series of frames at the first underexposed setting by N, iteratively indexing a capturing of another second series of frames at the second underexposed setting by N and iteratively indexing a capturing of another third series of frames at the third underexposed setting by N.

In the disclosed multiple-exposure-multiple-frame method, the input images are in linear raw format and there are several frames for any different exposures.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "Include." "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of multiple-exposure multiple-frame image capture, making an HDR video, comprising:
    capturing a first series of frames at a first underexposed setting;
    selecting a first reference image from the first series of frames;
    aligning the first series of frames to the first reference image;
    merging the first series of frames into one first frame based on the first reference image;
    capturing a second series of frames at a second underexposed setting;

selecting a second reference image from the second series of frames;

aligning the second series of frames to the second reference image;

merging the second series of frames into one second frame based on the second reference image; and fusing the one first frame and the one second frame.

2. The method of multiple-exposure multiple-frame image capture of claim 1, further comprising:

indexing a capturing of another first series of frames at the first underexposed setting by N; and indexing a capturing of another second series of frames at the first underexposed setting by N.

3. The method of multiple-exposure multiple-frame image capture of claim 1, further comprising:

iteratively indexing a capturing of another first series of frames at the first underexposed setting by N; and iteratively indexing a capturing of another second series of frames at the first underexposed setting by N.

4. The method of multiple-exposure multiple-frame image capture of claim 1, wherein the first series of frames and the second series of frames are raw data.

5. The method of multiple-exposure multiple-frame image capture of claim 1, wherein the first series of frames and the second series of frames are low dynamic range.

* * * * *